United States Patent [19]

Berry

[11] Patent Number: 5,197,785
[45] Date of Patent: Mar. 30, 1993

[54] TWO PIECE ADAPTER RIM FOR WHEEL ASSEMBLIES

[75] Inventor: Verne H. Berry, Weston, Canada

[73] Assignee: Industrial Tires Limited, Mississauga, Canada

[21] Appl. No.: 803,831

[22] Filed: Dec. 9, 1991

[30] Foreign Application Priority Data

Jul. 15, 1991 [CA] Canada ................................ 2047019

[51] Int. Cl.⁵ .............................................. B60B 3/00
[52] U.S. Cl. ................................ 301/63.1; 301/105.1; 301/9.1
[58] Field of Search .......... 301/5 R, 62, 63 R, 63 DS, 301/105 R, 111, 9 DN, 9 R, 10 R, 9 TV

[56] References Cited

U.S. PATENT DOCUMENTS

| 2,619,389 | 11/1952 | James ........................ 301/105 R X |
| 4,966,212 | 10/1990 | Hill ................................. 152/302 |

FOREIGN PATENT DOCUMENTS

| 886466 | 11/1971 | Canada . | |
| 981312 | 1/1976 | Canada . | |
| 990764 | 6/1976 | Canada . | |
| 15790 | 8/1956 | Fed. Rep. of Germany ...... 301/111 |
| 270922 | 1/1933 | Italy ............................... 301/63 R |
| 152151 | 10/1920 | United Kingdom ........... 301/63 DS |
| 543519 | 3/1942 | United Kingdom ............ 301/9 DN |

OTHER PUBLICATIONS

A brochure by Setco TM for a tire assembly referred to as "Junk Yard Dog".

*Primary Examiner*—Russell D. Stormer
*Attorney, Agent, or Firm*—Bereskin & Parr

[57] ABSTRACT

A two piece adapter rim for wheel assemblies comprises a band formed generally into a circle having inner and outer surfaces wherein the outer surface is for carrying a rubber tire. The assembly includes additionally an outer disc mounted within the band on the inner surface, the outer disc having a central first opening and a plurality of second openings located around the periphery of the first opening. Also included is a replaceable inner adapter disc, the adapter disc having a plurality of third openings which register with the second openings of the outer disc, and a plurality of fourth openings which register with a fixed pattern of attachments of a hub. The hub would be of a piece of heavy machinery or equipment to which the wheel assembly would be attached. A series of bolts are used to secure the adapter disc to the outer disc and then the wheel assembly may be mounted on a hub. In the event the wheel is to be used on different piece of equipment, the wheel can be removed from the hub, the inner adapter disc exchanged for a different adapter disc, and remounted onto a different hub having a different fixed attachment configuration.

10 Claims, 3 Drawing Sheets

TWO PIECE ADAPTER RIM FOR WHEEL ASSEMBLIES

FIELD OF THE INVENTION

This invention relates to the field of ground engaging wheels for vehicles, and more particularly, to rim assemblies for such wheels which are used to attach the wheels to hubs of, for example, heavy equipment or machinery.

BACKGROUND OF THE INVENTION

Pneumatic tires, while common in general public use, have proven to be insufficient for certain off-road conditions. Rough terrain and difficult working environments such as scrap yards, steel mills, waste disposal sites, and logging operations, to name just a few, require more durable and wear resistant tires than can be provided by pneumatic tires which rely on the integrity of the pneumatic chamber for rideability. Consequently, developments have been made in the area of solid tires which are more durable in such off road applications which would otherwise be likely to puncture pneumatic tires.

There are a wide variety of machines and manufacturers which produce off-the-road machinery and vehicles. Unfortunately, there are also a wide variety of hub and axle configurations each with its own bolt spacing and bolt circle diameter. To be able to mount their tires on such machines, tire manufacturers must provide rims which match these various hub-bolt configurations. This has resulted tire manufacturers having to make specific tire rims, unique to particular configurations for each make of machine, making the manufacture of such tires less efficient and more expensive.

Prior efforts to deal with this problem have thus far been unsatisfactory. Attempts have been made to provide a rim assembly which is, to a limited degree, adaptable to different bolt configurations. For example, two prior Canadian patents, 886,468, dated Nov. 23, 1971 and titled Automotive Wheel Structure and No. 981,312, dated Jan. 6, 1976 and titled Custom Wheel Assembly, disclose inventions which attempt to deal with this problem.

The 886,468 patent teaches a rim having holes of a larger diameter than necessary to accommodate the hub bolts, which larger diameter is to accommodate varying bolt circle configurations. The rim is placed over the bolts on the hub. The gaps that are left by reason of the over size holes are then filled in by special adapter bosses. However, this invention requires a plurality of special bosses, one for each bolt of the hub and thus is expensive and difficult to use.

The invention of the 981,312 patent is similar in that it teaches a rim having radial slots to allow for variation in the bolt circle diameter. A cover plate is also provided that has a series of holes positioned to conform with the different placements of the bolts in different diameter bolt circles. The cover plate is fastened tightly over the bolts and by being tightly fastened down onto the rim prevents the rim from sliding relative to the bolts located in the slots in the rim. However, this is expensive and is of limited adaptability due to the radial nature of its slots.

Further, both of these patents are directed at the decorative wheels in the automobile industry. As there are only three primary bolt circle diameters in the automotive field, both inventions only comprehend variations for the three standard types. Furthermore, they do not provide for any changes in the number of bolts or variability in the angular spacing between them. To provide a wheel for a hub whose bolt circle diameter is not one of the three standard or whose number of bolts is different, a completely unique rim would be required. Thus their scope of actual adaptability is very narrow.

It is desirable to decrease the number of unique rims and thus reduce costs of manufacture. It is also desirable to promote greater flexibility for a given tire in that an owner may be able to use it on a number of different vehicles thus extending its useful life. What is also desired is a means by which tire rims can be universally adaptable to the bolt spacing for hubs of the various machines that are presently being made by different domestic and foreign industrial equipment manufacturers.

BRIEF SUMMARY OF THE INVENTION

According to the present invention there is provided a wheel rim assembly for mounting a wheel onto different pieces of equipment, each having a hub, wherein each hub has a fixed pattern of attachments for mounting a ground engaging wheel thereon, said wheel rim assembly comprising:
- a band formed generally into a circle having inner and outer surfaces, wherein the outer surface is for carrying a rubber tire,
- an outer disc mounted within the band on the inner surface, the outer disc having a central first opening and a plurality of second openings located around the periphery of the first opening,
- a replaceable inner adaptor disc, the adaptor disc having a plurality of third openings registering with said second openings of said outer disc, and a plurality of fourth openings registering with said fixed pattern of attachments of one of said hubs, and
- a means for releasably securing said inner adapter disc to said outer disc,
- wherein said wheel assembly may be mounted on different hubs having different fixed patterns of attachment by replacing said inner adapter disc.

BRIEF DESCRIPTION OF THE FIGURES

Reference will now be made to the following figures which illustrate, by way of example only, preferred embodiments of the present invention and in which.

DETAILED DESCRIPTION OF PREFERRED EMBODIMENT

Figure 1:
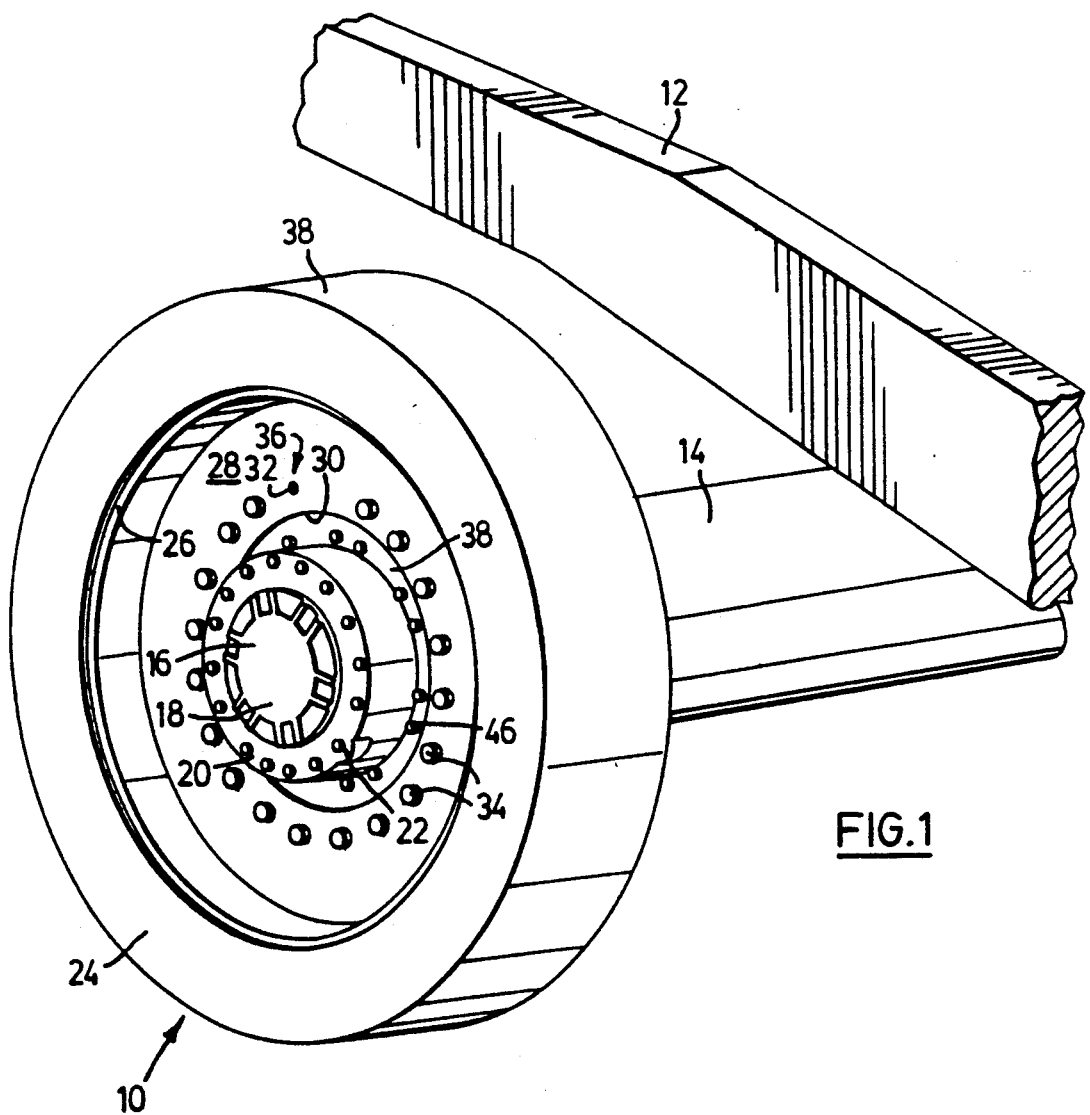
FIG. 1 is a perspective view of a wheel assembly according to the presenting invention installed upon a piece of equipment.

Referring to FIG. 1, a wheel assembly according to the present invention illustrated generally at 10 is shown. Also shown is a piece of heavy equipment 12 which may be a grader, front end loader or the like. The heavy equipment 12 has an axle 14 which ends in a hub 16. The hub 16 comprises an outer face plate 18 and a clamping ring 20. The clamping ring 20 includes a plurality of bolts 22. The hub and its components are typically unique to a particular manufacturer, but are generally well understood, and thus are not discussed in any more detail herein.

Also shown is a solid tire portion indicated as 24 which is mounted on a band 26. The band 26 includes an outer disc 28 mounted therein which has a first central opening 30. Located around the first central opening are a plurality of second openings 32 which contain bolts 34. For example, at 36 one of the bolts has been left off, disclosing one of the second openings 32. Also shown is a replaceable inner adapter disc 38 which is described in more detail below.

Figure 2:
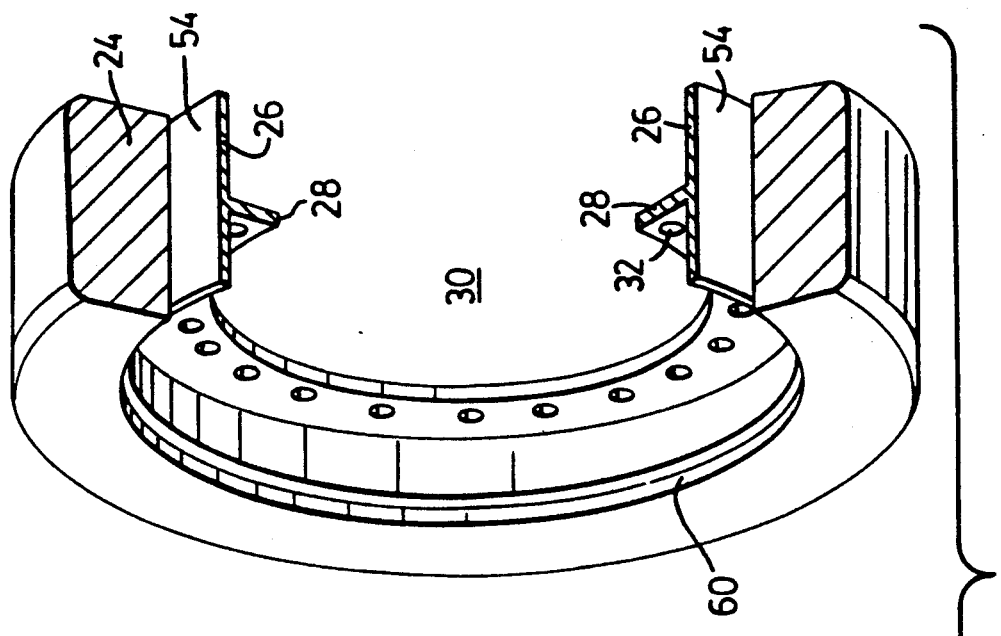
FIG. 2 is a perspective view with cut-away sections for the purpose .of illustration of the wheel assembly of FIG. 1 without the equipment.
Figure 2:
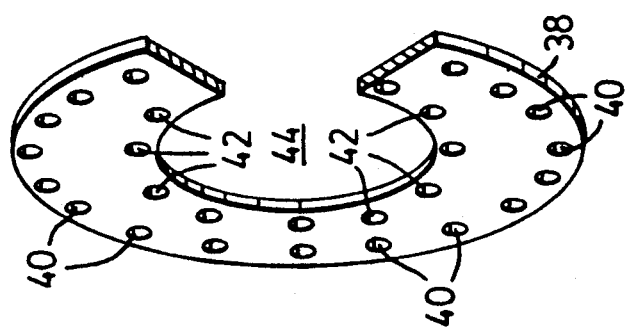

Turning now to FIG. 2, the solid tire 24 is shown in break away section along with the band 26. Also, the outer disc 28 can be seen with a plurality of second openings 32 and the first central opening 30.

The adapter disc 38 is also shown, again in break away section. The adapter disc 38 includes a plurality of third openings 40 which register with the second openings 32 spaced around the periphery of the first opening 30. In addition, the inner adapter disc 38 includes a plurality of fourth openings indicated as 42. The fourth openings 42 are located around the periphery of a fifth opening 44. The fifth opening 44 is sufficiently large to accommodate the hub 16 of the axle 14 which may protrude therethrough. This is illustrated in FIG. 1.

The choice of spacing of the plurality of fourth openings 42 is determined by the hub 16. As previously described, the hubs from different manufacturers of different models and brands of equipment utilize different bolt hole spacings. Different bolt hole spacings require different bolt hole spacings on wheel rim assemblies in order to register therewith. The exact position of the plurality of fourth openings 42 is determined by the specific fixed pattern of attachments of any one of such hubs. This fixed pattern of attachment is shown in FIG. 1 at 46.

Although not shown in FIG. 2, FIG. 1 shows a plurality of bolts 46 and 48 which respectively secure the inner disc to the outer disc, and the inner disc to the hub 16. It will be appreciated by those skilled in the art that the openings 32, 40 and 42 are preferably circular, although other shapes may be used, provided sufficient attention is paid to overall strength and wear considerations. What is needed is a sufficient number of fastening means, such as number 5 cap bolts, to carry to vehicle without failing.

Figure 3:
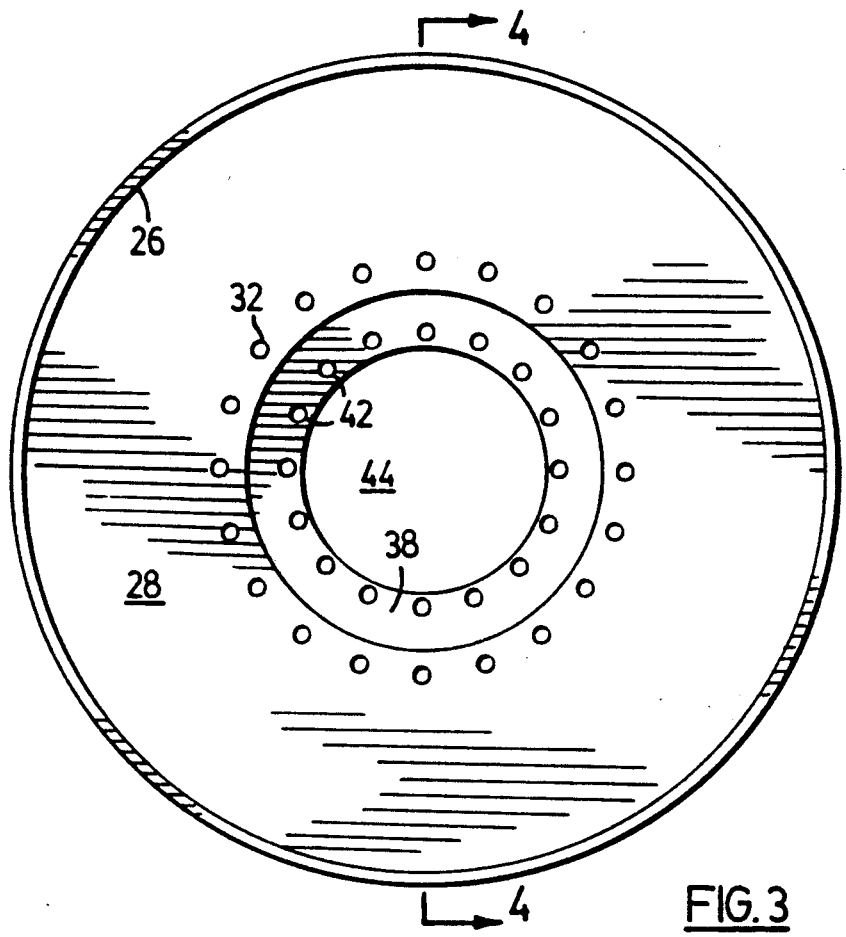
FIG. 3 is a side view of the wheel assembly of FIGS. 1 and 2.

Turning to FIG. 3, a plan view of the wheel rim assembly 10 according to the present invention can be seen. In the view of FIG. 3, the third openings 40 are shown registering with the second openings 32. As shown in FIG. 3, good results have been achieved using 20 openings 32, 40 and when the adapter disc 38, and the outer disc 28 are formed from $\frac{3}{4}''$ plate steel and by forming openings 32, 40 as one inch diameter holes on a 23.5 inch diameter bolt circle. Also, openings 42 may be formed as one inch diameter holes. It will be appreciated that the number of holes 32, 40 could be varied, for example by using fewer larger diameter bolts, or more smaller diameter bolts, but that it is important that the number of holes 32, 40 remains standard, no matter what equipment the tire assembly 10 is to be fitted to. This permits the tires to be manufactured on standard equipment, and allows the same tires to be adaptable to difficult hubs merely by replacing the adapter disc 38.

It will be appreciated that although 16 holes 42 are shown, and may be one inch in diameter, the number of holes 42, spacing and diameter will vary according to the hub being fitted.

Figure 4:
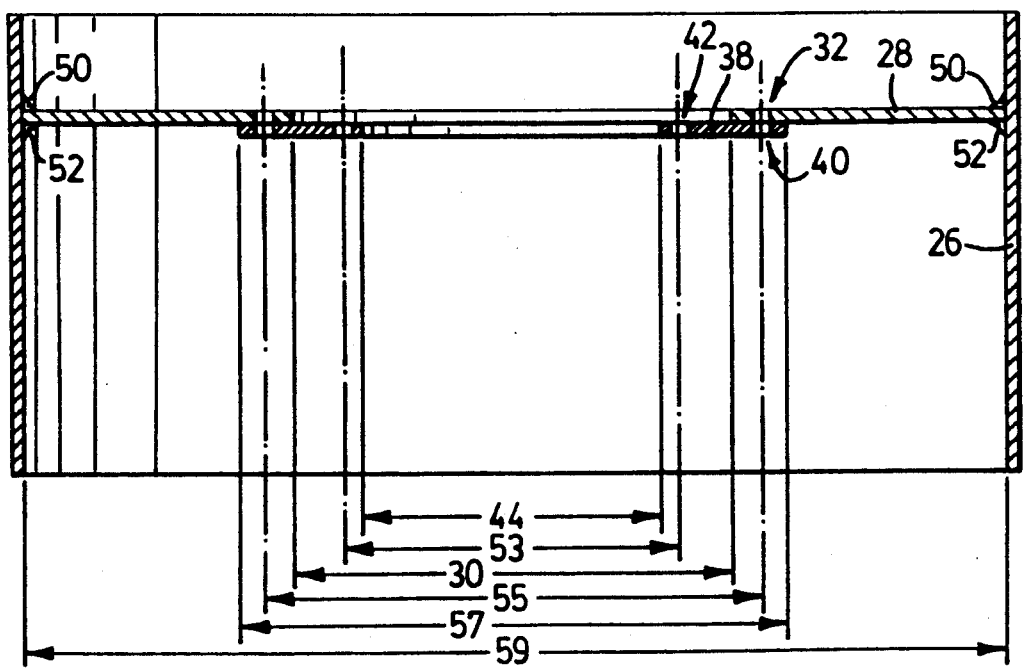
FIG. 4 is a section view along lines 4—4 of FIG. 3.

Finally, in FIG. 4, a cross-sectional view through lines 4—4 of FIG. 3 illustrates the invention further. In particular, it can be noted that the outer disc 28 may be mounted inside the band 26 at any convenient position within the band 26. Thus, it is not necessary to locate the inner disc 28 centrally within the band 26 but there may be a certain amount of offset to suit particular types of axles and hub assemblies on the equipment on which the wheel assembly 10 is to be mounted. Goods results have been achieved when the outer disc 28 is welded to the band 26 on both sides around the periphery as shown at 50, 52.

It will be appreciated by those skilled in the art that the selection of the materials and the welding has to be done with due regard to the strains to be placed on the wheel assembly 10. However, good results have been achieved by using $\frac{3}{4}''$ 44 w steel plate, and CSA W59 welds. Due regard must always be had however to the overall loading to which any such wheel is to be subjected to, and the design of the steel components will need to meet such loading requirements according to accepted engineering safety design principles.

Also shown in FIG. 4 is the diameter of the circle of openings 42 which is denoted as 53. As discussed above, this will vary to suit a particular pattern of attachments of a given hub as will the diameter of the opening 44. Also shown is a diameter 55 of openings 32, 40. Good results have been achieved by making this diameter 55 26.5 and diameter of opening 30 23.50 inches. Also shown is an outer diameter 57 for the inner disc 38 as well as an outer diameter 59 for the outer disc 28, which may be 29 inches and 52.5 inches respectively.

Referring back to FIG. 2, there can be seen an overhang 60, where the tire portion extends past the band 26, at the outer surface 54. In particularly aggressive environments, the steel band 26, which is somewhat brittle compared to the rubber 24, is protected by the rubber 24.

It can now be appreciated how the instant invention aids in the manufacturing process. It will be appreciated that each piece of equipment will have its own unique bolt hole pattern, and that many will have need of a particular tire width, depth and tread pattern. Where a solid rubber tire is preferred, the preferred manufacturing process is to build up the rubber onto the outer band 26. If each tire assembly required a different mount for use in the manufacturing process, then the manufacture would be much more expensive and a number of unique mounts would have to be kept on hand to be used as needed. However, since according to the present invention the openings 32 are spaced and located in identical positions, for different tire assemblies, only one type of mount need be used in the manufacturing of tire assemblies for all kinds of different equipment.

It can now be appreciated that use of replaceable inner adapter discs has several advantages. Firstly, the outer disc is formed with a standard bolt hole pattern 32, so that different adapter discs can be fitted to the same wheel assembly 10. Thus, the same outer wheel may be mounted on different hubs of different manufacturing. This also means that the wheel assembly 10 can be mounted on a standard mount during manufacturing which means only one type of mount is necessary and different wheel assemblies can thus be made using the same manufacturing equipment. In the event the second hub requires a different offset of the outer disc to the band, a certain degree of flexibility is provided by mounting the adapter disc on the inside or outside (relative to the hub) of the outer disc. This provides even more flexibility and in the case of ¾" plate steel, a 1 ½" variance.

It will be appreciated by those skilled in the art that various alternatives can be made to the invention yet still fall within the broad scope of the appended claims. Some of these alternations have been discussed above and others will be apparent to those skilled in the art.

I claim:

1. A wheel rim assembly for mounting a wheel onto different pieces of equipment, each having a hub, wherein each hub has a fixed pattern of attachments for mounting a ground engaging wheel thereon, said wheel rim assembly comprising:

an outer support band formed generally into a circle having inner and outer surfaces, wherein the outer surface is for carrying a rubber tire, an outer disc mounted within the band on the inner surface, the outer disc having a central first opening and a plurality of second openings located around the periphery of the first opening, a replaceable inner adaptor disc, the adaptor disc having a plurality of third openings registering with said second openings of said outer disc, and a plurality of fourth openings registering with said fixed pattern of attachments of one of said hubs, and a means for releasably securing said inner adapter disc to said outer disc, wherein said wheel assembly may be mounted on different hubs having different fixed patterns of attachment by replacing said inner adapter disc.

2. The wheel rim assembly of claim 1 wherein said outer disc is mounted within said outer band with a predetermined amount of offset, so the wheel rim assembly may be fit onto a particular hub.

3. The wheel rim assembly of claim 1 wherein said replaceable inner adapter disc may be mounted on either side of said outer disc, to vary the amount of the predetermined offset between wheel assembly and said hub upon which the wheel rim assembly is to be mounted.

4. The wheel rim assembly of claims 1 or 2 wherein the outer disc is mounted generally at right angles to said band.

5. The wheel rim assembly of claim 1 or 2 wherein said assembly further includes a solid tire mounted on said outer face of said band.

6. The wheel rim assembly of claim 1 wherein said adapter disc further includes a central fifth opening.

7. The wheel rim assembly of claim 1 wherein said first, second, third and fourth openings are circular in shape.

8. The wheel rim assembly of claim 7 wherein said fifth opening is circular in shape.

9. The wheel rim assembly of claim 1 wherein said means for releasably attaching said adaptor disc to said outer disc comprises a plurality of bolts releaseably secured through said registering third and second openings.

10. The wheel rim assembly of claim 5 wherein said solid rubber tire extends beyond the external side edges of the outer support band.

* * * * *